US012112568B2

United States Patent
Östlund

(10) Patent No.: US 12,112,568 B2
(45) Date of Patent: Oct. 8, 2024

(54) BIOMETRIC OPTICAL ANTISPOOFING BASED ON IMAGING THROUGH A TRANSMISSION ANGULAR DEPENDENT OPTICAL FILTER

(71) Applicant: FINGERPRINT CARDS ANACATUM IP AB, Gothenburg (SE)

(72) Inventor: Petter Östlund, Lund (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/030,399

(22) PCT Filed: Oct. 14, 2021

(86) PCT No.: PCT/SE2021/051015
§ 371 (c)(1),
(2) Date: Apr. 5, 2023

(87) PCT Pub. No.: WO2022/086395
PCT Pub. Date: Apr. 28, 2022

(65) Prior Publication Data
US 2023/0377366 A1  Nov. 23, 2023

(30) Foreign Application Priority Data
Oct. 23, 2020 (SE) .................... 2051241-4

(51) Int. Cl.
*G06V 40/13* (2022.01)
*G02B 5/28* (2006.01)
(Continued)

(52) U.S. Cl.
CPC ......... *G06V 40/1394* (2022.01); *G02B 5/281* (2013.01); *G06V 10/143* (2022.01);
(Continued)

(58) Field of Classification Search
None
See application file for complete search history.

(56) References Cited

U.S. PATENT DOCUMENTS

| 8,148,671 B2 | 4/2012 | Kurahashi |
| 10,216,975 B1 | 2/2019 | He et al. |
| (Continued) | | |

FOREIGN PATENT DOCUMENTS

JP   2018005723 A   1/2018

OTHER PUBLICATIONS

International Search Report and Written Opinion for International Application No. PCT/SE2021/051015 mailed Dec. 6, 2021, 10 pages.

*Primary Examiner* — Joseph R Haley
(74) *Attorney, Agent, or Firm* — RMCK Law Group, PLC

(57) ABSTRACT

A biometric imaging arrangement configured to acquire an image of an object comprising: an image sensor comprising a photodetector pixel array configured to detect light transmitted from the object for capturing an image, an optical filter assembly comprising at least an optical interference filter, the optical filter assembly being arranged to cover the photodetector pixel array, and the optical filter assembly having an infrared cut-off wavelength to at least partly block infrared light from reaching the photodetector pixel array, the optical filter assembly further having at least a first cut-off wavelength in the visible range of wavelengths, wherein the first cut-off wavelength depends on the angle of incidence of the received light on the optical filter assembly.

20 Claims, 5 Drawing Sheets

(51) Int. Cl.
*G06V 10/143* (2022.01)
*G06V 40/12* (2022.01)

(52) U.S. Cl.
CPC .......... *G06V 40/13* (2022.01); *G06V 40/1318* (2022.01); *G06V 40/1324* (2022.01); *G06V 40/1382* (2022.01)

(56) References Cited

U.S. PATENT DOCUMENTS

| | | |
|---|---|---|
| 10,527,764 B2 | 1/2020 | Kim et al. |
| 2010/0321770 A1 | 12/2010 | Pyo et al. |
| 2014/0023249 A1 | 1/2014 | Higuchi |
| 2017/0091506 A1 | 3/2017 | Sinha et al. |
| 2018/0005005 A1 | 1/2018 | He et al. |
| 2019/0157337 A1* | 5/2019 | Lin .................... G06V 40/1318 |
| 2019/0180072 A1 | 6/2019 | Fomani et al. |
| 2020/0034597 A1 | 1/2020 | He et al. |
| 2021/0264128 A1* | 8/2021 | Feng ..................... G06F 3/0412 |

* cited by examiner

BIOMETRIC OPTICAL ANTISPOOFING BASED ON IMAGING THROUGH A TRANSMISSION ANGULAR DEPENDENT OPTICAL FILTER

CROSS-REFERENCE TO RELATED APPLICATIONS

This application is a 371 U.S. National Stage of International Application No. PCT/SE2021/051015, filed Oct. 14, 2020, which claims priority to Swedish Patent Application No. 2051241-4, filed Oct. 23, 2020. The disclosures of each of the above applications are incorporated herein by reference in their entirety.

TECHNICAL FIELD

The present invention generally relates to a biometric imaging arrangement, to an electronic device comprising a biometric imaging arrangement, and to a method for biometric authentication of a biometric object using a biometric imaging arrangement.

BACKGROUND

Biometric systems are widely used as means for increasing the convenience and security of personal electronic devices, such as mobile phones etc. Fingerprint sensing systems are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

One of the problems associated with fingerprint sensors concerns so-called spoof fingers trying to mimic a live fingerprint to thereby deceive a fingerprint sensor. If fraud by the spoof finger is successful, unauthorized access to systems may undesirably be approved or unauthorized transactions may be approved which may lead to disastrous consequences. A common approach to assess the liveness of an object using optical fingerprint sensors is to filter the light transmitted from an object and study for example the amount of red light detected by the sensor. For this, pixels of the optical sensor are covered by red filters, which are in addition to e.g. infrared filters thereby leading to integration challenges.

It is therefore of interest to provide better integration of optical components that provides for preventing unauthorized access using biometric spoofs.

SUMMARY

In view of above-mentioned and other drawbacks of the prior art, it is an object of the present invention to provide a biometric imaging arrangement with improved integration of optical elements for enabling anti-spoofing capability in a cost-efficient way. The present invention provides for a single-filter solution that allows for both infrared protection for an image sensor of the biometric imaging arrangement and for spoof detection capabilities.

According to a first aspect of the invention, there is provided a biometric imaging arrangement configured to acquire an image of an object, the biometric imaging arrangement comprising: an image sensor comprising a photodetector pixel array configured to detect light transmitted from the object for capturing an image, an optical filter assembly comprising at least an optical interference filter, the optical filter assembly being arranged to cover the photodetector pixel array, and the optical filter assembly having an infrared cut-off wavelength to at least partly block infrared light from reaching the photodetector pixel array, the optical filter assembly further having at least a first cut-off wavelength in the visible range of wavelengths, wherein the first cut-off wavelength depends on the angle of incidence of the received light on the optical filter assembly.

The present invention is based on the realization to design an optical filter assembly to have both an infrared cut-off wavelength to prevent infrared light to reach the image sensor pixels, and at the same time with at least a first cut-off wavelength in the visible range of wavelengths. In this way, the infrared cut off filter required for most image sensors is designed with a further cut-off wavelength being in the visible wavelength range. The first cut-off wavelengths can be tailored to provide for liveness detection capabilities.

Further, the first cut-off wavelength depends on the angle of incidence of the light. In other words, the first cut-off wavelength is shifted if the angle of incidence is varied. For example, a light beam reaching the filter at a first incident angle is filtered according to a different cut-off wavelength compared to a light beam reaching the filter at a second incident angle different from the first incident angle. Thus, the first cut-off wavelength is a variable first cut-off wavelength that depends on the light angle of incidence, or more specifically on the chief ray angles. This allows for using specific pixels of the image sensor that collect light at a certain angle of incidence from the object, i.e. for predetermined chief ray angles, to collect light useful for liveness detection.

For example, if light of a selected wavelength at or near the first cut-off wavelength is analyzed for each of the pixels, a shift in the intensity at the selected wavelength is observable based on a distance in the image from the corresponding center of the pixel array. In other words, the optical filter assembly provides for a radial distribution of detected wavelengths, or intensity in a narrow wavelength range, due to the incidence angle-dependent optical filter assembly. Further, as mentioned above, the optical filter assembly also provides the necessary infrared cut-off filtering.

As a further example, if light transmitted from an object passes trough the optical filter assembly with a chief ray angle, the spectrum of the light detectable by the image sensor for that chief ray, that may or may not be equipped with color filters, will be of a first spectrum characteristic. If another chief ray angle is considered, with the effect that the angle of incidence of the other chief ray is different from the first one, the spectrum of the light detectable by the image sensor for that other chief ray will have been affected by different filtering characteristics due to the incident angle dependent optical filter assembly. Thus, the detectable light spectrum has a second spectrum characteristic different from the first one. In other words, the optical filter assembly is transmissive to light of varying wavelengths where the variation depends on the chief ray angle of the incident light.

By means of the claimed invention, optical anti-spoofing can be implemented by means of studying color information in an image captured while filtering using a single filter that also provides for infrared cut-off. In other words, the need for additional dedicated filters for liveness detection or anti-spoofing is eliminated.

The term "image sensor" should be interpreted broadly and may be any suitable type of image sensor, such as a CMOS or CCD sensor connected to associated control circuitry. In one possible implementation the image sensor is a thin-film transistor (TFT) based image sensor which provides a cost-efficient solution. The photodetectors are individually controllable and configured to detect an amount of incoming light and to generate an electric signal indicative of the light received by the detector. The operation and control of such image sensors can be assumed to be known and will not be discussed herein.

Infrared cut-off generally means that light of wavelengths in the infrared range, i.e. higher than approximately 600 nm, or higher than approximately 580 nm, or higher than approximately 650 nm, or higher than approximately 700 nm are attenuated. Wavelengths at or higher than approximately 900 nm significantly suppressed or even blocked by the optical filter assembly.

The visible wavelength range is herein from approximately 380 nm to approximately 740 nm.

Interference filters are generally based on reflecting some wavelengths and transmitting other wavelengths with little or no absorption. Interference filters may comprise a layered structure of dielectrics that can provide for angular dependent transmission of selected wavelengths.

In embodiments, the optical filter assembly may be adapted to at least partly block light within a blocking subrange of the visible wavelength range, wherein the blocking subrange cut-off wavelengths depends on the angle of incidence of the received light on the optical filter assembly. In other words, the optical filter attenuates or even completely blocks light of wavelengths within a subrange of the visible wavelength range. This blocking wavelength range depends on the incident angle of the light being filtered. Advantageously, this provides for a shift in an entire blocking wavelength band across the pixel array, i.e. depending on the incident angle of light. This may be utilized for improved spoof or liveness detection.

In embodiments, the optical filter may be adapted to have a second cut-off wavelength in the visible range of wavelengths, wherein the second cut-off wavelength depends on the angle of incidence of the received light on the optical filter assembly. Accordingly, an incident angle dependent shift in two cut-off wavelengths is proposed, where the shift depends on the angle of incidence. Thus, as seen in by the image sensor, there may be a radial dependence in the intensity of light for at least two wavelengths across the pixel array. For example, the first cut-off wavelength may be in the red range of visible light and the second cut-off wavelength may be in the blue range of visible light. This provides a shift in the intensity of blue and red light across the image sensor caused by the optical filter assembly that reflects the angle of incidence of the chief ray from the object on the optical filter assembly.

Preferably, the optical filter assembly may be configured to block infrared light for all incident angles. For example, the optical filter assembly may for example attenuate light of wavelengths from approximately 600 nm or from approximately 700 nm, up to at least or approximately 1000 nm, or up to at least or approximately 1100 nm.

The infrared cut-off wavelength is independent of angle of incidence.

In embodiments, the optical filter assembly may comprise an absorptive filter for blocking infrared light. Accordingly, an absorptive filter element may be included in the optical assembly for providing infrared cut-off filtering.

The optical filter assembly may comprise an absorptive filter and an interference filter. For example, the absorptive filter may be a top structure of the optical filter assembly and the interference filter may be a bottom layer of the filter assembly facing the image sensor. The interference filter being attached to the absorptive filter. In other possible implementations, the absorptive filter may be a bottom structure facing towards the image sensor. The interference filter may be arranged on the absorptive filter structure as a top layer.

The absorptive filter may serve as a substrate for the interference filter. For example, the absorptive filter may be a tinted glass substrate on which an interference filter is manufactured in a layered structure of antireflection coatings and/or other interference filter components.

The absorptive filter comprises an absorptive material that absorbs light above an infrared cut-off wavelength.

In embodiments, the optical filter assembly may cover the entire photodetector pixel array of the image sensor. This advantageously reduces the amount of stray light from reaching the image sensor photodetector pixel array.

In embodiments, the biometric imaging arrangement may be configured to perform biometric authentication based on a radial distribution of wavelengths in an acquired image.

In embodiments, the biometric imaging arrangement may be configured to perform biometric authentication based on a radial intensity distribution in an acquired image.

The radial distribution obtained due to the optical filter assembly having the angular dependent cut-off wavelength(s). Since a live biometric object, such as a finger, has a distinguished color response compared to artificial biometric object, such as a spoof finger made from e.g. plastics or rubber material or even paper, the radial distribution of wavelengths and/or intensity will be different for a live object compared to a spoof object. This is especially valid for wavelengths in the red wavelength range of approximately 580 nm to approximately 700 nm, or even 740 nm.

For example, liveness/spoof detection may be based on a relation between signals indicative of light intensities detected by photodetectors arranged at different distances from the center of the photodetector pixel array. Thus, a first signal may be acquired indicative of the detected light from a first set of photodetector pixels radially arranged a first distance from the center of the photodetector pixel, and a second signal may be acquired indicative of the detected light from a second set of photodetector pixels radially arranged a second distance from the center of the photodetector pixel. The second distance and the first distance being different, and liveness/spoof detection may be based on a relation between the first and second signal. The first and second signal may be indicative of a light of a respective wavelength spectrum, where the wavelength spectrums of the light detected by the first and second sets of photodetectors are different due to the angular dependence of the optical filter assembly. Various metrics based on comparing intensities and wavelength distributions may be extracted from the radial distribution of wavelengths and/or intensities caused by the optical filter assembly, where the metrics may be used for evaluating for liveness and/or anti-spoofing.

In embodiments, the biometric imaging arrangement may be configured to be arranged under an at least partly transparent display panel and to acquire an image of an object located on the opposite side of the least partly transparent panel.

The transparent display panel may comprise the color controllable light source. Such as a display based on OLED, u-LED with any type of tri-stimulus emission like RGB, CMY or others.

According to a second aspect of the invention, there is provided an electronic device comprising: an at least partly transparent display panel; the biometric imaging arrangement according to embodiments herein, and processing circuitry configured to: receive a signal from the biometric imaging arrangement indicative of a biometric object touching the at least partly transparent display panel, perform a biometric authentication procedure based on the detected biometric object.

The biometric object may be a fingerprint.

The electronic device may be e.g. a mobile device such as a mobile phone (e.g. Smart Phone), a tablet, a phablet, smart watch, etc.

Further effects and features of the second aspect of the invention are largely analogous to those described above in connection with the first aspect of the invention.

According to a third aspect of the invention, there is provided a method for biometric authentication of a biometric object using a biometric imaging arrangement comprising: an image sensor comprising a photodetector pixel array configured to detect light transmitted from the object for capturing an image, and an optical filter assembly comprising at least an interference filter arranged to cover the photodetector pixel array and being adapted to at least partly block infrared light from reaching the photodetector pixel array, wherein the optical filter assembly further is adapted to have at least a first cut-off wavelength in the visible range of wavelengths, wherein the first cut-off wavelength depends on the angle of incidence of the received light on the optical filter assembly, wherein the method comprises: acquiring an image of the object; and performing biometric authentication based on an evaluation of the radial distribution of wavelengths in the acquired image, or, based on a radial distribution of intensities in the acquired image.

In embodiments, the biometric authentication may be based on an intensity of red light detected by one of a first set of photodetector pixels and a second set of photodetector pixels compared to the intensity of light detected by the other one of the first set of photodetector pixels and the second set of photodetector pixels. Red light information is advantageously used in combination with at least one of a green light information and blue light information for anti-spoofing procedures.

In embodiments, the biometric authentication may be based on a relation between the intensity of the detected red light compared to an intensity of blue and/or green light detected by the other one of the first and second set of photodetector pixels. The relation between the intensities of different detected colors may advantageously be used for forming various metrics for anti-spoofing, since live biometric object have different color response compared to artificial objects.

In embodiments, the first set of pixels may be outer photodetector pixels and the second set of pixels may be inner photodetector pixels, where the inner photodetector pixels are closer to the center of the photodetector pixel array than the outer photodetector pixels.

Further effects and features of the third aspect of the invention are largely analogous to those described above in connection with the first aspect and the second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging arrangement according to the present invention are mainly described with reference to a biometric imaging arrangement arranged under a display panel. However, it should be noted that the described imaging device also may be used in other optical fingerprint imaging applications such as in an optical fingerprint sensor located under a cover glass or the like.

Figure 1A:
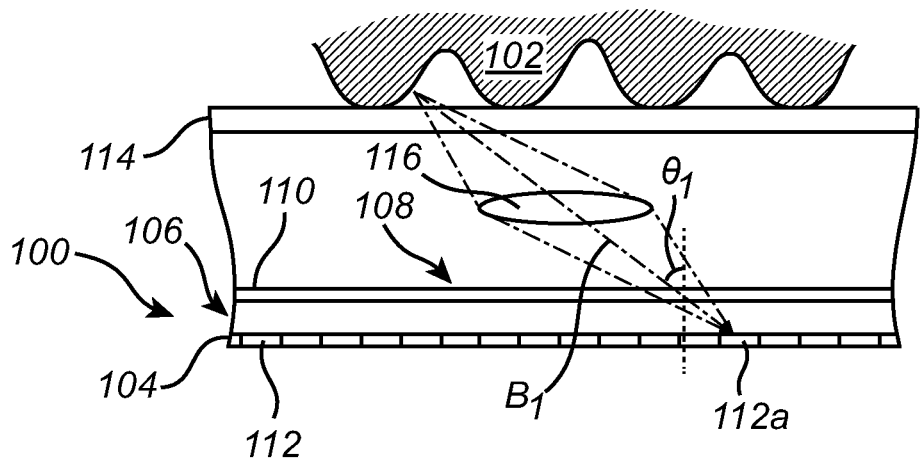
FIG. 1A-B conceptually illustrates a side-view of a biometric imaging arrangement according to embodiments of the invention.
Figure 1B:
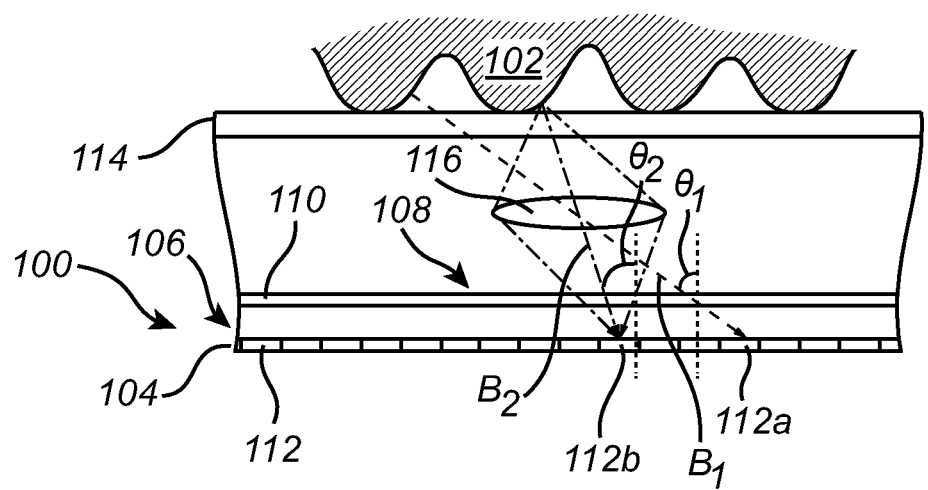

FIGS. 1A-B conceptually illustrates a biometric imaging arrangement 100 configured to acquire an image of a biometric object 102. The biometric imaging arrangement comprises an image sensor 104 comprising a photodetector pixel array 106 configured to detect light transmitted from the object 102 for capturing an image. Furthermore, the biometric imaging arrangement 100 comprises an optical filter assembly 108 comprising at least an interference filter 110. The optical filter assembly 108 being arranged to cover the photodetector pixel array 106 and has an infrared cut-off wavelength to at least partly block infrared light from reaching the photodetector pixel array 106. The optical filter assembly 108 further being adapted to have at least a first cut-off wavelength in the visible range of wavelengths. The first cut-off wavelength depends on the angle of incidence of the received light on the optical filter assembly 108.

In FIG. 1A, conceptual light beams transmitted from a finger 102 placed on a cover structure 114 are illustrated. The light beam B1 is the chief ray transmitted through the center of the lens 116. The light beam B1 having a first angle of incidence θ1 on the optical filter assembly 108.

Similarly, and now turning to FIG. 1B, conceptual further light beams transmitted from the finger 102 placed on the cover structure 114 are illustrated, where the light beam B2 is a chief ray transmitted through the center of the lens 116. The light beam B2 having a second angle of incidence θ2 on the optical filter assembly 108. For comparison, the chief ray B1 is also shown in FIG. 1B. Due to the angular dependence of the first cut-off wavelength of the optical filter assembly 108, the wavelength spectrum and intensity thereof detected by the photodetector pixel 112a is different from the wavelength spectrum detected by the photodetector pixel 112b.

Advantageously, such difference in wavelength spectrum may be utilized for liveness/spoof detection. For example, a relation between light intensity in a wavelength spectrum detected by different pixels may be different for live biological material such as provided by a finger, compared to the relation of wavelength intensity spectrums detected by different pixels for typical spoof materials such as paper, rubber, plastic, etc.

More precisely, light transmitted from living objects typically has a characteristic red component often not seen in non-living materials. Therefore, the radial distribution of light intensity in an image having the herein proposed optical filter assembly will be different for a living object compared to a non-living object. This knowledge is utilized for spoof/liveness detection.

Preferably, the optical filter assembly 108 covers the entire photodetector pixel array 106 of the image sensor 104. Thus, light that is detected by the image sensor has passed through the optical filter assembly. This provides for protecting the image sensor pixels from infrared radiation which otherwise may saturate the image sensor. However, it is conceivable that the optical filter assembly only partly covers the photodetector pixel array 106.

Figure 2:
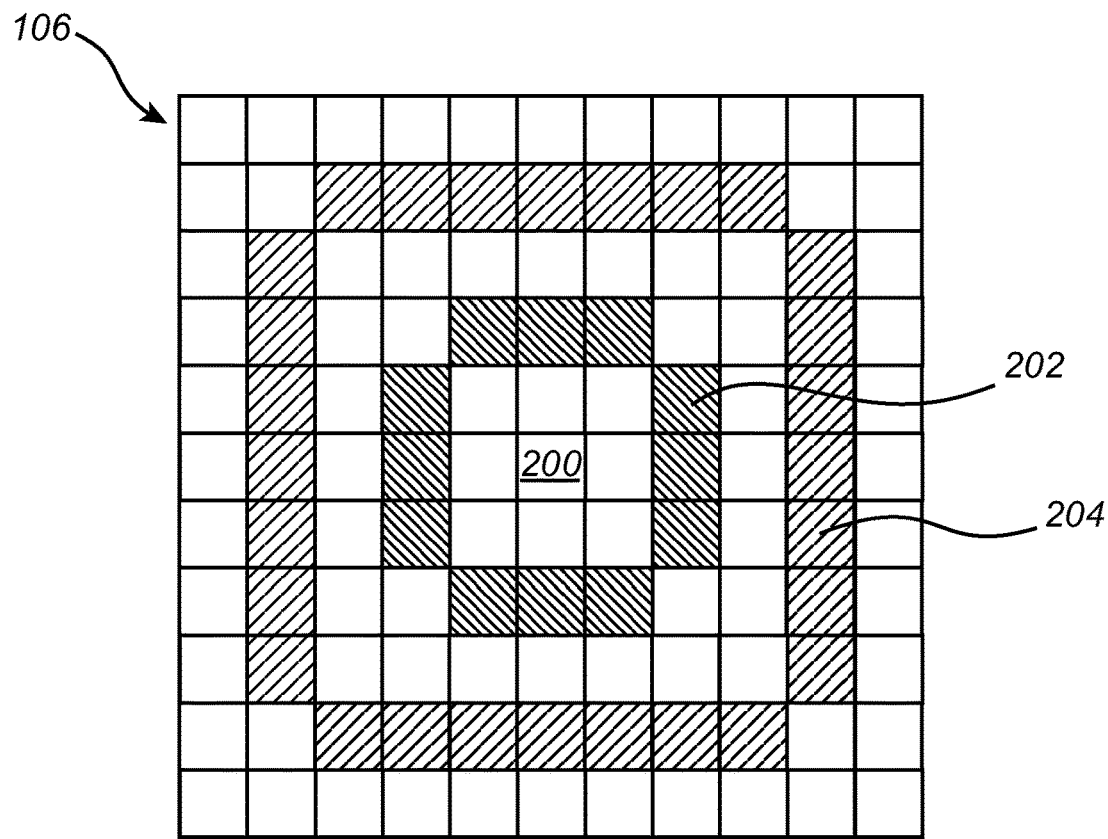
FIG. 2 illustrates different radially separated sets of pixels of an image sensor of a biometric imaging arrangement according to embodiments of the invention.

FIG. 2 conceptually illustrates two different sets of pixels arranged at different distances from the center of the photodetector pixel array 106. Pixel 200 here denotes a center of the photodetector pixel array 106, however, note that the center does not necessarily have to be a specific pixel but may be a geometric center point of the photodetector pixel array 106.

The first set 202 of pixels are arranged at a first radial distance from the center point 200 and the second set 204 of pixels are arranged at a second radial distance from the center point 200. Thus, the second set 204 of pixels are outer photodetector pixels and the first set 202 of pixels are inner photodetector pixels, where the inner photodetector pixels 202 are closer to the center 200 of the photodetector pixel array than the outer photodetector pixels 204.

Generally, points further out on the pixel array corresponds to a higher so-called chief ray angle which can be considered the angle between the optical axis of the light transmitted from the object, e.g. the center of the imaged object as seen by the sensor, and the chief ray reaching a specific pixel. Thus, considering a point of the object, pixels at different distances from the center 200 of the photodetector pixel array will receive light, from that given point of the object, that has passed through the filter at different angles.

For example, now again turning to FIG. 2, the first set 202 of pixels receives light transmitted from the object that has passed through the filter 110 (see FIG. 1A-B) at a distribution of chief ray angles that is different compared to distribution of chief ray angles of the light that has passed through the filter and that is detected by the second set 204 of pixels. This further means that, due to the angular optical filter assembly, the intensity of light at or around the first cut-off wavelength as detected by the first set 202 of pixels is different from the intensity of light at or around the first cut-off wavelength as detected by the second set 204 of pixels. By considering that this effect is present across the entire photodetector pixel array, in a continuous manner, a radial distribution of wavelengths and/or light intensities characteristic of the optical filter assembly and the imaged object may be detectable. A radial intensity distribution at or near the first cut-off wavelength may be considered. A realization that there is distinction between radial intensity distribution for a spoof material compared to that of a live material is used for liveness detection.

Figure 3:
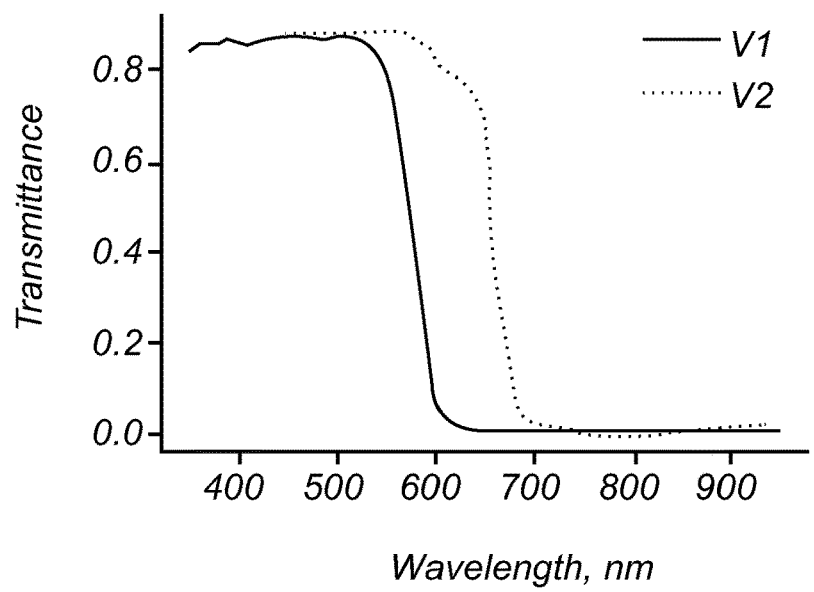
FIG. 3 is a graph illustrating a transmittance versus wavelength of light through an optical filter assembly for different incidence angles according to embodiments of the invention.

FIG. 3 is a graph illustrating an example transmittance of light through an optical filter assembly for two different incidence angles, angle V1 (solid) and angle V2 (dashed) versus wavelength. The cut-off wavelength of the filter for light incident angle V1 is below the cut-off wavelength for the incidence angle V2. This leads to, as discussed above, that a captured image, where incoming light has been filtered by the filter, will have a radial distribution of wavelengths, at or near the cut-off wavelength for the optical filter assembly.

The optical filter assembly is transmissive to light of wavelengths below the respective cut-off wavelength depending on the angle of incidence, i.e. V1 or V2.

Figure 4:
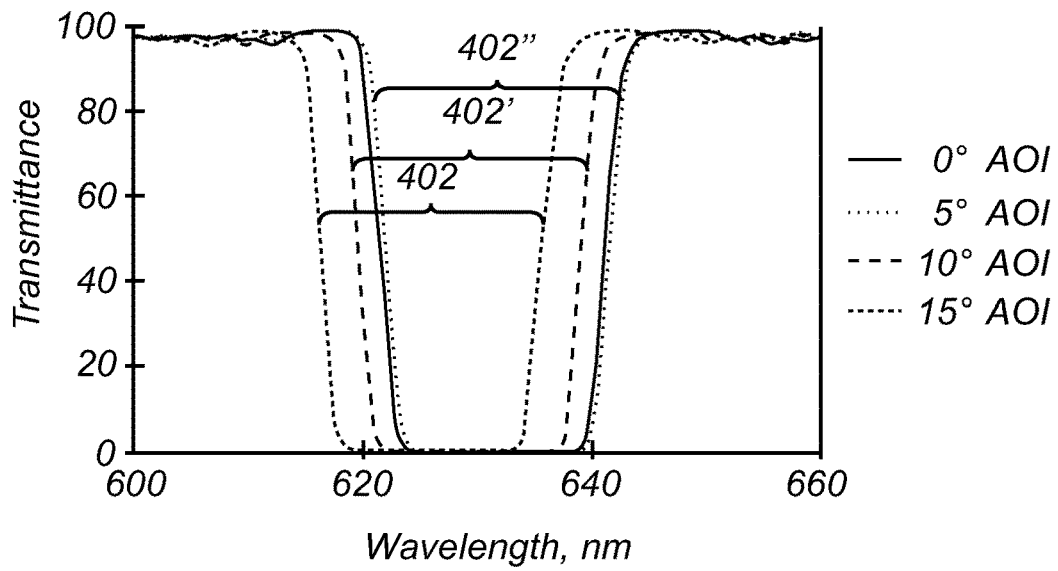
FIG. 4 is a graph illustrating a transmittance versus wavelength of light through an optical filter assembly for different incidence angles according to embodiments of the invention.

Turning to FIG. 4 illustrating a further graph of transmittance of light through an optical filter assembly for different incidence angles. This optical filter assembly is adapted to at least partly block light within a blocking subrange 402 of the visible wavelength range. The blocking subrange cut-off wavelengths depends on the angle of incidence of the received light on the optical filter assembly. FIG. 4 illustrates that the cut-off wavelengths for the blocking subrange 402 will shift to e.g. 402' or 402" depending on the angle of incidence (AOI). Thus, the blocking subrange 402 will shift depending on the location of the pixels with respect to the optical filter assembly and object being imaged, thereby resulting in a radial distribution of wavelengths across the photodetector pixel array 106. Thus, the optical filter assembly is not transmissive to light in the blocking subrange that depends on the angle of incidence, or the transmission of light in the blocking subranges is at least substantially attenuated.

Figure 5:
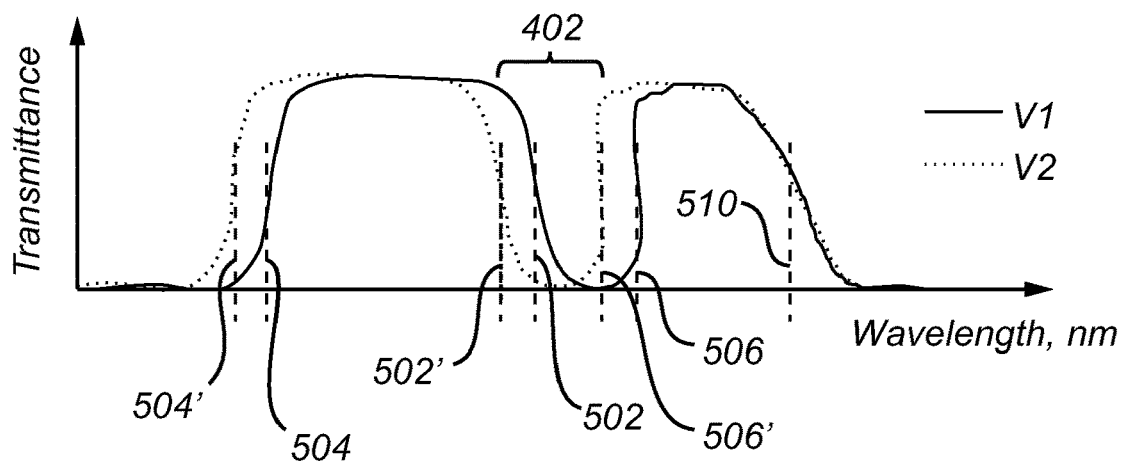
FIG. 5 is a graph illustrating a transmittance versus wavelength of light through an optical filter assembly for different incidence angles according to embodiments of the invention.

FIG. 5 illustrates a transmittance graph for a further possible optical assembly adapted to have a second cut-off wavelength 504 in the visible range of wavelengths in addition to the first cut-off wavelength 502. This second cut-off wavelength 504 depends on the angle of incidence, here V1 or V2, of the received light on the optical filter assembly. For example, the first cut-off wavelength 502, 502' may be in the red range of visible light, e.g. in the range of 600-740 nm and the second cut-off wavelength 504, 504' is in the blue range, e.g. in the range of 450-500 nm of visible light. A further cut-off wavelength 506, 506' provides for a blocking subrange 402 of wavelengths as illustrated also in FIG. 4. The optical filter assembly is here transmissive to light of wavelengths between the respective pair of cut-off wavelengths, i.e. between cut-off wavelengths 502 and 504, between cut-offs 502' and 504', and between cut-offs 502" and 504", depending on the angle of incidence.

The optical filter assembly according to each of the embodiments described herein may be configured to block infrared light for all incident angles. Thus, as exemplified in FIG. 5, the IR-cut off wavelength 510 is independent of angle of incidence.

Figures 6A, 6B:
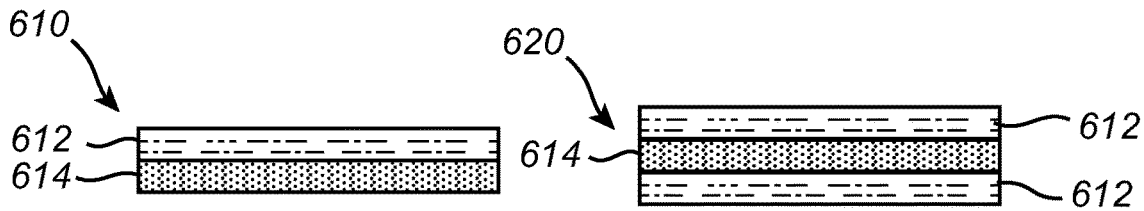
FIG. 6A conceptually illustrates an example optical filter assembly according to embodiments of the invention.
FIG. 6B conceptually illustrates an example optical filter assembly according to embodiments of the invention.

FIG. 6A conceptually illustrates an optical filter assembly 610 according to possible embodiments of the invention. The optical filter assembly 610 comprises an optical interference filter 612 conceptually illustrated as a layered structure of dielectrics, although other interference filters may be conceivable. Further, the interference filter 612 is arranged on, or even manufactured on, a bottom substrate 614 that may be or comprise an absorptive filter for blocking infrared light. The absorptive properties of absorptive filters are independent of incident angle, thus the infrared cut-off wavelength of the absorptive filter 614 is independent of light incident angle. The bottom substrate may be an absorptive glass substrate 614. The interference filter 612 may equally well be manufactured, or attached to, a bottom side of the absorptive filter 614 such that the interference filter 612 faces the image sensor when installed on the image sensor.

FIG. 6B conceptually illustrates another optical filter assembly 620 according to possible embodiments of the invention. Here, the optical filter assembly 620 comprises the absorptive filter 614 which is interleaved or sandwiched between interference filters 612. Thus, there are interference filters on both sides of the absorptive filter 612.

Figure 7:
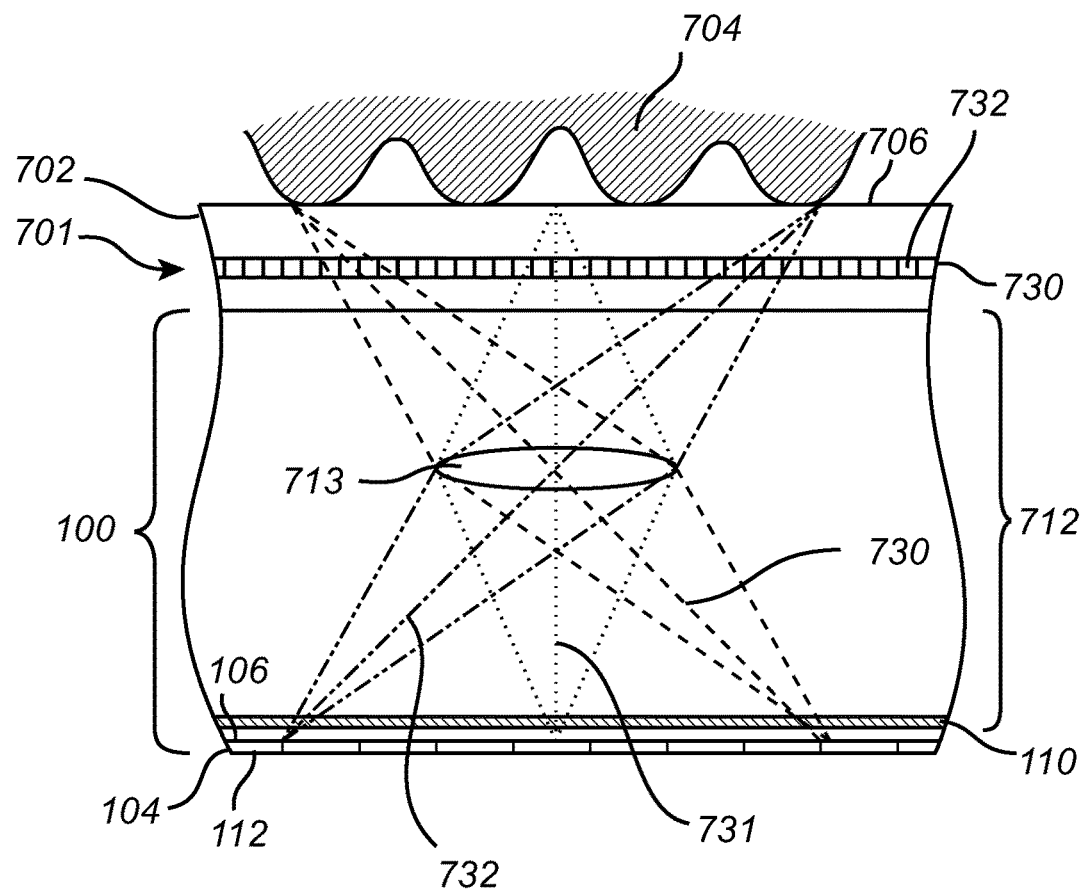
FIG. 7 conceptually illustrates a schematic side-view of an biometric imaging arrangement arranged under an at least partly transparent display according to embodiments of the invention.

FIG. 7 schematically illustrates a biometric imaging arrangement 100 according to an embodiment of the invention. The biometric imaging arrangement 100 is here arranged under an at least partially transparent display panel 701. However, the biometric imaging arrangement 100 may be arranged under any cover structure which is sufficiently transparent, as long as the image sensor 104 receives a sufficient amount of light to capture an image of a biometric object in contact with the outer surface of the cover structure, such as a fingerprint or a palmprint. In the following, a biometric imaging arrangement 100 configured to capture an image of a finger 704 in contact with an outer surface 706 of a cover glass 702 of the display panel 701 is described.

The biometric imaging arrangement 100 comprises the image sensor 104 including the photodetector pixel array 106, where each pixel 112 is an individually controllable photodetector configured to detect an amount of incoming light and to generate an electric signal indicative of the light received by the detector.

In some embodiments, the biometric imaging arrangement 100 further comprises an optical stack 712 arranged to cover the image sensor 104. The optical stack 712 may include various layers and components such as a transparent substrate covering the image sensor 104, a set of optical redirection elements such as lenses 713, opaque layers having of separate openings for the lenses, an adhesive layer to attach the display panel 701 to the biometric imaging arrangement 100, air gaps, and antireflection coatings.

Moreover, for completeness, the at least partly transparent display panel 701 here comprises a color controllable light source 730 comprising individually controllable light emitting pixels 732. For acquiring an image of e.g. a fingerprint or palmprint, the color controllable light source 730 may emit light that is reflected by the finger 704 and detected by the pixels 112 of the image sensor 104. There are suitable openings or optical paths past the color controllable light source 730 so that the light beams being transmitted from the finger 704 can reach the image sensor 702.

A set of chief rays 730, 731, 732 transmitted from the finger 704 and through the optical filter assembly 108 is shown. The chief ray 731 having an orthogonal angle of incidence on the optical filter assembly 108, and the chief rays 730 and 732 having angles of incidence smaller than 90 degrees.

The optical filter assembly 108 is arranged in the optical stack 712 and is here shown arranged on the image sensor 104 below the lens 713. However, the optical filter assembly 108 may equally well be arranged elsewhere in the optical stack 712 such as between a lens 713 and the display 701. In such case, a structure in the optical stack 712 may serve as a support structure for the optical filter assembly 108.

Figure 8:
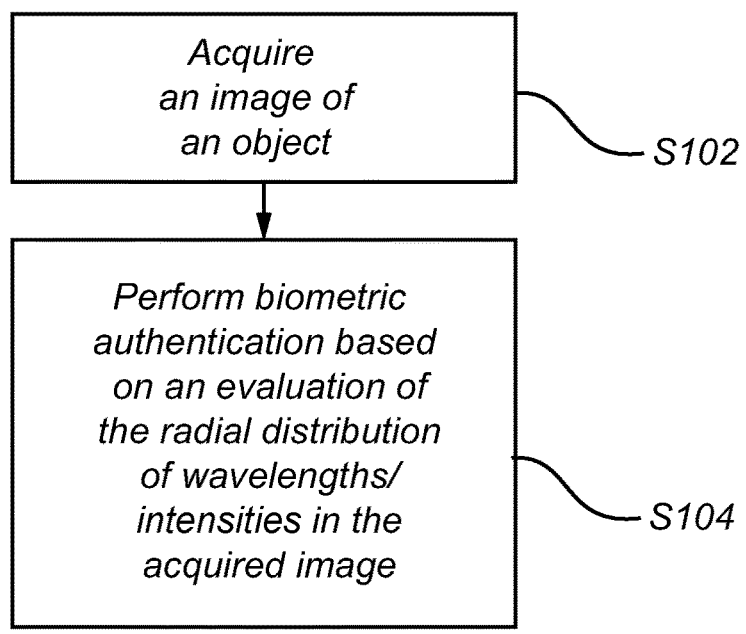
FIG. 8 is a flow-chart of method steps according to embodiments of the invention.

FIG. 8 is a flow-chart of method steps according to embodiments of the invention. The method is for biometric authentication of a biometric object using a biometric imaging arrangement according to embodiments herein. The biometric imaging arrangement comprises an image sensor comprising a photodetector pixel array configured to detect light transmitted from the object for capturing an image. The biometric imaging arrangement further comprises an optical filter assembly comprising at least an interference filter arranged to cover the photodetector pixel array and configured to at least partly block infrared light from reaching the photodetector pixel array. The optical filter assembly further is adapted to have at least a first cut-off wavelength in the visible range of wavelengths, wherein the first cut-off wavelength depends on the angle of incidence of the received light on the optical filter assembly.

The method comprises step S102 of acquiring an image of the object using the biometric imaging arrangement. Further, in step S104, performing biometric authentication based on an evaluation of the radial intensity distribution in the acquired image, and/or based on a radial distribution of wavelengths in the image.

Turning again to FIG. 2, the biometric authentication may be based on an intensity of red light detected by one of a first set 202 of photodetector pixels and a second set 204 of photodetector pixels compared to the intensity of light, of any one color, detected by the other one of the first set 202 of photodetector pixels and the second set 204 of photodetector pixels. For example, in one embodiment, biometric authentication is based on a relation between the intensity of the detected red light compared to an intensity of blue and/or green light detected by the other one of the first 202 and second set 204 of photodetector pixels.

The biometric imaging arrangement is here conceptually illustrated with one lens. However, it should be understood that this lens only exemplifies an optical lens assembly that may include several lenses and/or other optical components. Further, the size and location of the lens is only shown for illustrative and exemplifying purposes, thus the lens my for example be larger and cover the entire photodetector pixel array, or the lens may represent a smaller lens in an optical lens assembly. The optical filter assembly described herein may be located under the optical lens assembly, interleaved between lenses in the optical lens assembly, or be arranged above the optical lens assembly in the optical stack.

The biometric imaging arrangement may be a camera type optical fingerprint sensor.

In some possible implementation, the biometric imaging arrangement may include color filters of different colors covering the photodetector pixels. For example, a first set of the pixels may be covered by red filters, a second set of the pixels may be covered by blue filters, and a third set of the pixels may be covered by green filters. This may advantageously further enhance the effect of radial distribution of wavelengths and/or radial distribution of intensity for a given wavelength range across an acquired image.

Figure 9:
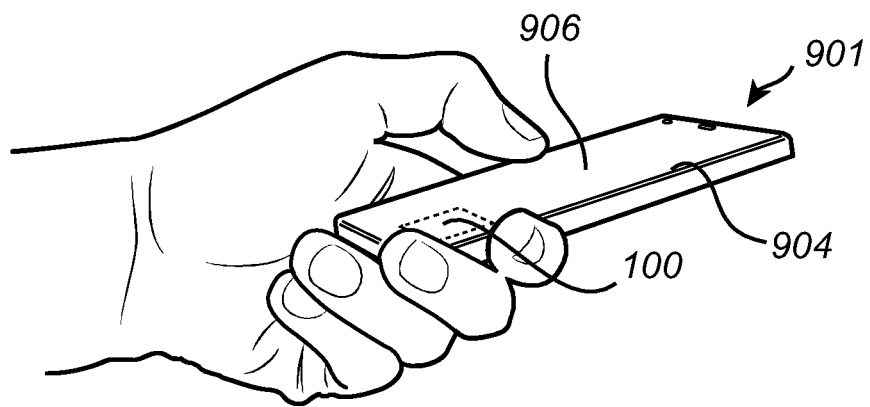
FIG. 9 schematically illustrates an example of an electronic device according to embodiments of the invention.

Turning now to FIG. 9, there is schematically illustrated an example of an electronic device configured to apply the concept according to the present disclosure, in the form of a mobile device 901 with an integrated in-display biometric imaging device 100 and a display panel 904 with a touch screen interface 906. The biometric imaging device 100 may, for example, be used for unlocking the mobile device 901 and/or for authorizing transactions carried out using the mobile device 901, etc.

Preferably and as is apparent for the skilled person, the mobile device 901 shown in FIG. 9 further comprises a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

Embodiments shown herein are possible to implement in in-display imaging devices.

Figure 10:
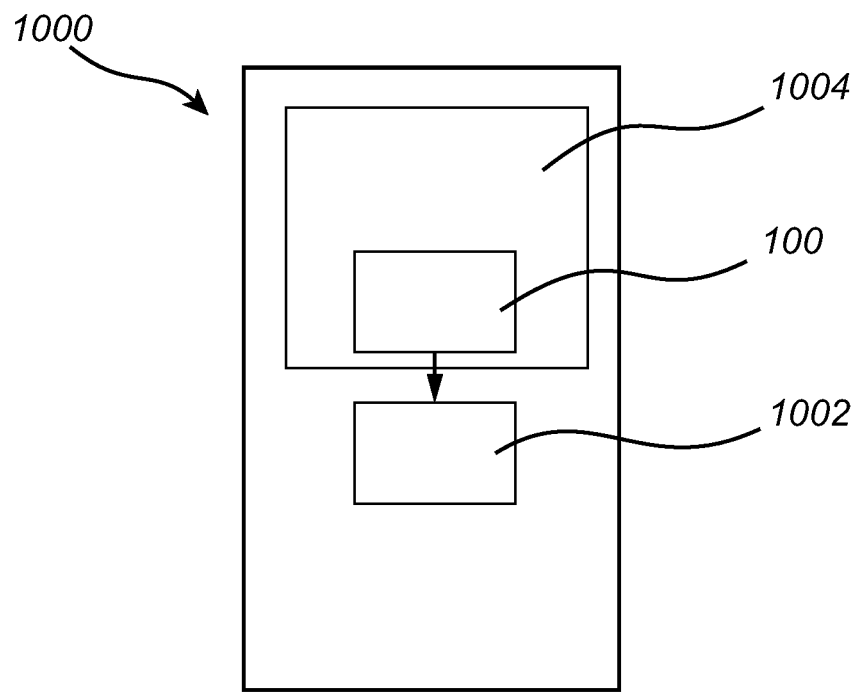
FIG. 10 is a schematic box diagram of an electronic device according to embodiments of the invention.

FIG. 10 is a schematic box diagram of an electronic device according to embodiments of the invention. The electronic device 1000 comprises a transparent display panel 1004 and a biometric imaging arrangement 100 conceptually illustrated to be arranged under the transparent display panel 1004 according to embodiments of the invention. Furthermore, the electronic device 1000 comprises processing circuitry such as control unit 1002. The control unit 1002 may be stand-alone control unit of the electronic device 1000, e.g. a device controller. Alternatively, the control unit 1002 may be comprised in the biometric imaging arrangement 100.

The control unit 1002 is configured to receive a signal indicative of a detected object from the biometric imaging arrangement 100. The received signal may comprise image data.

Based on the received signal the control unit 1002 is configured to detect a fingerprint, and based on the detected fingerprint the control unit 1002 is configured to perform a fingerprint authentication procedure for identifying the user. Such fingerprint authentication procedures are considered per se known to the skilled person and will not be described further herein.

Further, the control unit 1002 is configured to, based on the obtained image of the object, to perform biometric authentication based on an evaluation of the radial distribution of wavelengths in the acquired image. The control unit 1002 may be configured to conclude whether the object in the image is a spoof biometric object or a live biometric object based on the radial distribution of wavelengths.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the biometric imaging arrangement.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Even though the invention has been described with reference to specific exemplifying embodiments thereof, many different alterations, modifications and the like will become apparent for those skilled in the art. Also, it should be noted that parts of the imaging device and method for manufacturing the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A biometric imaging arrangement configured to acquire an image of an object, the biometric imaging arrangement comprising:
   an image sensor comprising a photodetector pixel array configured to detect light transmitted from the object for capturing an image,
   an optical filter assembly comprising at least an optical interference filter, the optical filter assembly being arranged to cover the photodetector pixel array, and the optical filter assembly having an infrared cut-off wavelength to at least partly block infrared light from reaching the photodetector pixel array, the optical filter assembly further having at least a first variable cut-off wavelength in the visible range of wavelengths, wherein the first cut-off wavelength depends on the angle of incidence of the received light on the optical filter assembly and is tailored for liveness detection, wherein the optical filter is adapted to have a second cut-off wavelength in the visible range of wavelengths, wherein the second cut-off wavelength depends on the angle of incidence of the received light on the optical filter assembly.

2. The biometric imaging arrangement according to claim 1, wherein the optical filter assembly is adapted to at least partly block light within a blocking subrange of the visible wavelength range, wherein the blocking subrange cut-off wavelengths depends on the angle of incidence of the received light on the optical filter assembly.

3. The biometric imaging arrangement according to claim 1, wherein the first cut-off wavelength is in the red range of visible light and the second cut-off wavelength is in the blue range of visible light.

4. The biometric imaging arrangement according to claim 1, wherein the optical filter assembly is adapted to block infrared light for all incident angles.

5. The biometric imaging arrangement according to claim 1, wherein the optical filter assembly comprises an absorptive filter for blocking infrared light.

6. The biometric imaging arrangement according to claim 1, wherein the optical filter assembly covers the entire photodetector pixel array of the image sensor.

7. The biometric imaging arrangement according to claim 1, configured to perform biometric authentication based on a radial distribution of wavelengths in an acquired image, or, based on a radial distribution of intensities in an acquired image.

8. The biometric imaging arrangement according to claim 1, configured to be arranged under an at least partly transparent display panel and to acquire an image of an object located on the opposite side of the least partly transparent panel.

9. An electronic device comprising:
an at least partly transparent display panel;
the biometric imaging arrangement according to claim 1, and
processing circuitry configured to:
receive a signal from the biometric imaging arrangement indicative of a biometric object touching the at least partly transparent display panel,
perform a biometric authentication procedure based on the detected biometric object.

10. The electronic device according to claim 9, wherein the electronic device is a mobile device.

11. A method for biometric authentication of a biometric object using a biometric imaging arrangement comprising:
an image sensor comprising a photodetector pixel array configured to detect light transmitted from the object for capturing an image, and
an optical filter assembly comprising at least an interference filter arranged to cover the photodetector pixel array and being adapted to at least partly block infrared light from reaching the photodetector pixel array,
the optical filter assembly further being adapted to have at least a first variable cut-off wavelength in the visible range of wavelengths, wherein the first variable cut-off wavelength depends on the angle of incidence of the received light on the optical filter assembly and is tailored for liveness detection, wherein the method comprises:
acquiring an image of the object; and
performing biometric authentication based on an evaluation of the radial distribution of wavelengths in the acquired image, or, based on a radial distribution of intensities in the acquired image.

12. The method according to claim 11, wherein the biometric authentication is based on an intensity of red light detected by one of a first set of photodetector pixels and a second set of photodetector pixels compared to the intensity of light detected by the other one of the first set of photodetector pixels and the second set of photodetector pixels.

13. The method according to claim 12, wherein biometric authentication is based on a relation between the intensity of the detected red light compared to an intensity of blue and/or green light detected by the other one of the first and second set of photodetector pixels.

14. The method according to claim 11, wherein the first set of pixels are inner photodetector pixels and the second set of pixels are outer photodetector pixels, where the inner photodetector pixels are closer to the center of the photodetector pixel array than the outer photodetector pixels.

15. A biometric imaging arrangement configured to acquire an image of an object, the biometric imaging arrangement comprising:
an image sensor comprising a photodetector pixel array configured to detect light transmitted from the object for capturing an image;
an optical filter assembly comprising at least an optical interference filter, the optical filter assembly being arranged to cover the photodetector pixel array, and the optical filter assembly having an infrared cut-off wavelength to at least partly block infrared light from reaching the photodetector pixel array; and
the optical filter assembly further having at least a first variable cut-off wavelength in the visible range of wavelengths, wherein the first cut-off wavelength depends on the angle of incidence of the received light on the optical filter assembly and is tailored for liveness detection,
wherein the biometric imaging arrangement is configured to perform biometric authentication based on: (i) a radial distribution of wavelengths in an acquired image, or (ii) a radial distribution of intensities in an acquired image.

16. The biometric imaging arrangement according to claim 15, wherein the optical filter assembly is adapted to at least partly block light within a blocking subrange of the visible wavelength range, wherein the blocking subrange cut-off wavelengths depends on the angle of incidence of the received light on the optical filter assembly.

17. The biometric imaging arrangement according to claim 15, wherein the optical filter assembly is adapted to block infrared light for all incident angles.

18. The biometric imaging arrangement according to claim 15, wherein the optical filter assembly comprises an absorptive filter for blocking infrared light.

19. The biometric imaging arrangement according to claim 15, wherein the optical filter assembly covers the entire photodetector pixel array of the image sensor.

20. An electronic device comprising:
an at least partly transparent display panel;
the biometric imaging arrangement according to claim 15, and
processing circuitry configured to:

receive a signal from the biometric imaging arrangement indicative of a biometric object touching the at least partly transparent display panel, and perform a biometric authentication procedure based on the detected biometric object.

\* \* \* \* \*